United States Patent [19]

Greene

[11] Patent Number: 5,289,995

[45] Date of Patent: Mar. 1, 1994

[54] SUPERSONIC AIRCRAFT

[75] Inventor: Leonard M. Greene, Scarsdale, N.Y.

[73] Assignee: The Boeing Company, Seattle, Wash.

[21] Appl. No.: 990,034

[22] Filed: Dec. 14, 1992

[51] Int. Cl.5 .............................................. B64C 15/00
[52] U.S. Cl. .................................... 244/15; 244/53 B
[58] Field of Search ................ 244/1 N, 15, 53 B, 55, 244/73 R, 74, 130

[56] References Cited

U.S. PATENT DOCUMENTS

| | | | |
|---|---|---|---|
| 2,649,266 | 8/1953 | Darrieus | 244/130 |
| 2,840,325 | 6/1958 | Griffith | 244/74 |
| 2,944,764 | 7/1960 | Lane et al. | 244/15 |
| 2,944,765 | 7/1960 | Lane et al. | 244/15 |
| 3,027,118 | 3/1962 | Willox | 244/15 |
| 3,314,629 | 4/1967 | Rethorst | 244/35 R |
| 3,794,274 | 2/1974 | Eknes | 244/130 |
| 4,168,044 | 9/1979 | Rethorst | 244/1 N |

Primary Examiner—Michael S. Huppert
Assistant Examiner—Anne E. Bidwell
Attorney, Agent, or Firm—B. A. Donahue; J. P. Hamley

[57] ABSTRACT

A supersonic aircraft includes an internal passageway, an articulated intake structure and an articulated exhaust structure which is connected to the intake structure by the passageway. The articulated intake structure defines an opening having a cross-section which is essentially equal to the cross-section of the aircraft's fuselage when configured for supersonic flight and smaller opening when configured for subsonic flight. Also, for supersonic flight, the cross-sectional area of the air intake structure decreases in the direction of air flow. For subsonic flight, the cross-sectional area of the air intake structure is relatively constant. For supersonic flight, the exhaust structure defines a cross-section which increases in the direction of air flow.

10 Claims, 1 Drawing Sheet

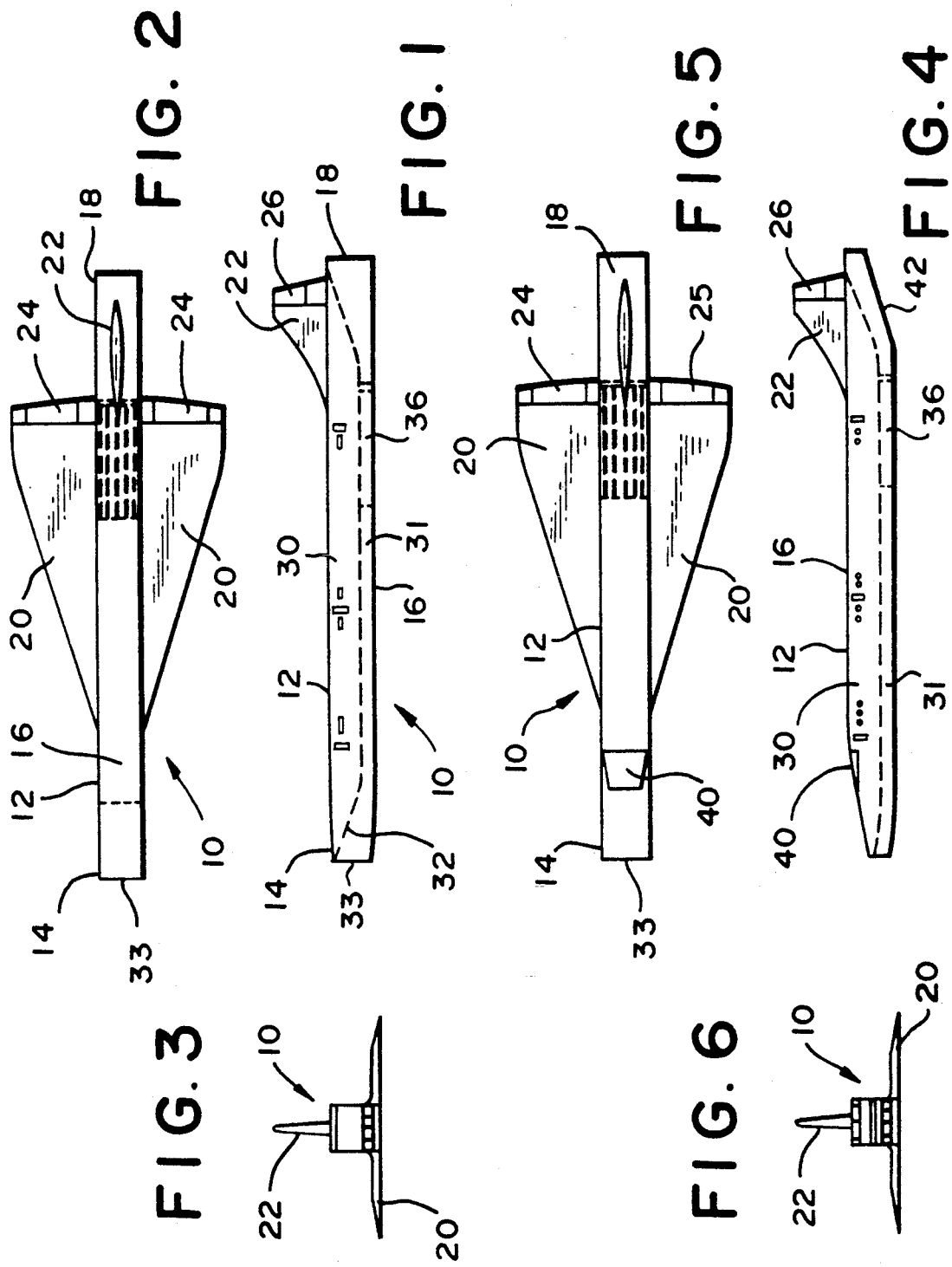

SUPERSONIC AIRCRAFT

This invention relates to an aircraft which is designed for flight at supersonic speeds and, more particularly, to a supersonic aircraft in which the adverse effects of sonic-boom are minimized.

BACKGROUND OF THE INVENTION

The commercial use of supersonic aircraft has been severely restricted because of the problem of sonic boom and the reluctance of the general public and federal regulators to tolerate sonic boom in heavily populated areas. For this reason, commercial aircraft such as the Concord are not permitted to fly at supersonic speed over the United States. It has also been recognized that from an efficiency standpoint, the degradation of energy through dissipative shock mechanisms reduces the lift/drag ratio of supersonic aircraft to the order of seven (7), as compared with values in excess of twenty (20) for subsonic aircraft. Accordingly, the cost of operating supersonic aircraft which generate dissipative shocks is marginal and poses a severe limitation on supersonic operations.

Aircraft designers have made numerous attempts to overcome the problems which are associated with sonic boom. For example, the United States patents of Rethorst, U.S. Pat. Nos. 4,168,044 and 3,314,629, disclose an energy conserving supersonic aircraft and a shockless supersonic aircraft, respectively. The United States patents of Griffith, U.S. Pat. No. 2,840,325, and of Ebner, U.S. Pat. No. 3,794,274, also disclose attempts to overcome the aforementioned problems. However, to date, there has been no known commercially-acceptable solution to the problems associated with sonic boom.

It is now believed that an aircraft in accordance with the present invention can be flown at Mach 3 or greater without generating an objectionable sonic boom, operated more efficiently than prior art designs and meet the other requirements of the commercial market.

BRIEF SUMMARY OF THE INVENTION

A supersonic aircraft in accordance with the present invention includes a longitudinally extending fuselage and a wing attached to the fuselage. The fuselage has forward, intermediate and rear portions with a space for carrying a payload disposed in the intermediate portion and a separate passageway extending through the fuselage and preferably under the payload. A propulsion means such as a jet engine or plurality of jet engines are disposed in the passageway and an exhaust exit area is disposed at the end of the passageway at the rear of the fuselage. The exhaust exit area is connected to the propulsion means by the passageway. A variable or articulated intake structure is disposed in the forward portion of the fuselage, i.e., at the front of the fuselage, for directing a flow of air into and through the separate passageway and into the propulsion means. The variable intake structure defines a first cross-sectional area in a first position for supersonic flight and a smaller cross-sectional area in a second position for subsonic flight. In its first position, the cross-sectional area of the variable intake structure is essentially equal to the cross-sectional area of the fuselage in the area of the payload.

In a preferred embodiment of the invention, the variable intake structure includes an articulated member forwardly of the propulsion means. When the articulated member is positioned for supersonic flight, it forms a converging nozzle-like structure which compresses the air before the air enters the propulsion means. The preferred embodiment of the invention also includes a variable or articulated exhaust structure which forms a diverging nozzle-like structure for supersonic flight.

BRIEF DESCRIPTION OF THE DRAWINGS

FIG. 1 is a side-elevational view of a supersonic aircraft according to a preferred embodiment of invention as it is configured for supersonic flight;

FIG. 2 is a top or plan view of the supersonic aircraft shown in FIG. 1;

FIG. 3 is a front-elevational view of the supersonic aircraft shown in FIGS. 1 and 2;

FIG. 4 is a side-elevational view of the supersonic aircraft shown in FIGS. 1 through 3, but as it is configured for subsonic flight;

FIG. 5 is a top or plan view of the supersonic aircraft shown in FIG. 4; and

FIG. 6 is a front-elevational view of the supersonic aircraft shown in FIGS. 4 and 5.

DETAILED DESCRIPTION OF THE PREFERRED EMBODIMENT OF THE INVENTION

The invention will now be described in connection with the accompanying drawings, wherein like reference numerals have been used to illustrate like parts.

As illustrated, an aircraft 10 has been designed to minimize external shock wave disturbances by means of an internal through-pass air flow. The aircraft 10 comprises a longitudinally extending fuselage 12 which includes forward, intermediate and rear portions 14, 16, and 18, respectively. The aircraft 10 also includes a conventional swept-back wing 20 and vertical fin 22 which are attached to the fuselage 12 in a conventional manner. The wing 20 and vertical fin 22 also include suitable control surfaces such as ailerons 24 and rudder 26.

In a preferred embodiment of the invention, a space 30 for carrying passengers is disposed in the intermediate portion of the fuselage 12. A longitudinally extending passageway 31 extends along the length of the fuselage 12 and is preferably disposed below space 30 and along the bottom of the aircraft 10. An articulated air intake structure 33 is disposed in the forward portion 14 of fuselage 12. The articulated air intake structure 33 forms or is at the front of the aircraft 10 and also leads into passageway 31. An exhaust exit structure 35 is disposed at the opposite end of passageway 31 in the rear portion of fuselage 12.

As shown more clearly in FIGS. 1 and 2, during supersonic flight the space 30 is fully encompassed by the outer wall of fuselage 12, by an articulated plate member or portion 32 of structure 33 and by an upper portion of passageway 31. In this configuration, the fuselage forms an obstruction-free generally rectangular tube-like structure 22. Essentially, all of the air encountered by the front of fuselage 12 passes into the air intake structure 33 and through the longitudinally extending passageway 31. Providing an intake with a cross section which is essentially equal to the cross section of the fuselage effectively reduces the surface area of the nose portion of the aircraft. In addition, the air intake structure 33 channels essentially all of the air encountered by the nose portion of the air intake into passageway 31 which is within the fuselage 12. Essentially all of the air passes through passageway 31 and into a plurality of turbo jet engines 36 which are disposed within passageway 31. As a result, drag upon the aircraft and the attendant sonic boom intensity are substantially reduced.

In a further effort to minimize drag, the exterior of the fuselage should be free of obstructions during supersonic flight. Accordingly, the fuselage 12 has the shape of a generally rectangular tube with a uniform cross-section which is free of obstructions, except for the wing 20 and vertical fin 22. For example, a cockpit windshield 40, shown in FIGS. 4 and 5, is totally covered by the air intake structure 33 during supersonic flight.

During supersonic flight, the articulated intake structure is of decreasing cross-sectional area in the direction of flow of air therethrough so that the air is compressed before entering the engines. At the same time, the exhaust exit area is of increasing cross-sectional area in the direction of air flow so that diffusion occurs in the duct. Also, at transitory speeds, i.e., those which are approaching the speed of sound or slightly greater than the speed of sound, it may be desirable to use mechanical means to assist in the compression of the air and thus reduce or eliminate shock waves caused by air spilling out of the air inlet structure.

For subsonic flight, the aircraft is configured as shown in FIGS. 4 through 6. For example, the articulated portion 32 of structure 33 is moved downwardly so that the cross-sectional area of passageway 31 remains relatively constant. This movement of portion 32 also uncovers the cockpit's windshield 40 to provide forward visibility for the pilots during landing or take-off. In addition, the rear portion 18 of fuselage 12 includes an articulated plate member 42 which is moved upwardly so that the exhaust area has a relatively uniform cross-sectional area for subsonic flight and to reduce any drag that would otherwise be caused by diffusion of the exhaust gases.

While the invention has been described in connection with one of its preferred embodiments, it should be understood that changes and modifications may be made without departing from the scope of the appended claims.

What is claimed is:

1. An aircraft designed for flight at supersonic speeds comprising a longitudinally extending fuselage and a wing attached thereto, said fuselage having forward, intermediate and rear portions with a space for carrying a payload disposed in said intermediate portion and with a separate passageway extending longitudinally through said fuselage, propulsion means disposed in said passageway and an exhaust exit structure disposed in said rear portion of said fuselage and connected to said propulsion means by said passageway, a variable air intake structure disposed in said forward portion of said fuselage for directing a flow of air into and through said separate passageway and into said propulsion means for exhaust thereby through said exhaust exit structure, said variable intake structure defining a first cross-sectional area in a first position for supersonic flight and a smaller cross-sectional area in a second position for subsonic flight and in which said passageway includes articulated means for reducing the cross-section thereof forwardly of said propulsion means to thereby compress the air passing through said passageway and into said propulsion means and in which said rear portion of said fuselage includes an articulated member rearwardly of said propulsion means which is positionable to increase the cross-sectional area of said exhaust exit structure in the direction of flow to an area which is essentially equal to the cross sectional area of said fuselage so that diffusion of the exhaust flow occurs therein during supersonic flight.

2. An aircraft designed for flight at supersonic speeds in accordance with claim 1, wherein said variable intake structure defines an opening with a cross-sectional area which is essentially equal to the cross-sectional area of said fuselage when said articulated intake structure is in its supersonic position.

3. An aircraft designed for flight at supersonic speeds in accordance with claim 2 wherein said fuselage has a generally rectangular uniform cross-section along its length when said articulated intake structure is in its supersonic position.

4. An aircraft designed for flight at supersonic speeds in accordance with claim 2 in which said variable intake structure includes an articulated plate member.

5. An aircraft designed for flight at supersonic speeds in accordance with claim 4 in which said passageway is disposed in the bottom of said fuselage and below said space for carrying a payload.

6. An aircraft designed for flight at supersonic speeds in accordance with claim 5 in which said passageway and said propulsion means are fully encompassed by said fuselage.

7. An aircraft designed for flight at supersonic speeds in accordance with claim 1 in which the cross-sectional area of said exhaust structure is essentially equal to the cross-sectional area of said variable air intake structure when the aircraft is configured for supersonic speeds.

8. An aircraft designed for flight at supersonic speeds comprising a fuselage and a wing attached to said fuselage, said fuselage having forward, intermediate and rear portions with a space for carrying a payload disposed in said intermediate portion and with a separate longitudinal passage extending through said fuselage and propulsion means disposed within said passage, an intake disposed forwardly of said propulsion means for directing a flow of air through said passage and into said propulsion means and a multi-positionable exhaust exit structure rearwardly of said propulsion means including a part of said rear portion of said fuselage forming an outwardly diverging nozzle when in a first position for supersonic flight and forming a passage with a relatively uniform cross-section when in a second position for subsonic flight.

9. An aircraft designed for flight at supersonic speeds comprising a fuselage and a wing attached to said fuselage, a longitudinal passage extending through said fuselage and turbo jet propulsion means disposed within said passage, an articulated intake structure disposed forwardly of said propulsion means for directing a flow of air through said passage and into said propulsion means, said articulated intake structure positionable in a first position for compressing air as it passes therethrough during supersonic flight and positionable in a second position for subsonic flight, said rear portion of said fuselage including an articulated member rearwardly of said propulsion means which forms a part of said exhaust structure, said articulated structure in a first position providing said exhaust structure with a relatively uniform cross-sectional area along the direction of flow for subsonic flight and in a second position providing said exhaust exit structure with an increasing cross-sectional area in the direction of flow so that diffusion occurs within said exhaust exit structure during supersonic flight.

10. An aircraft designed for flight at supersonic speeds in accordance with claim 9 wherein said articulated intake structure defines an opening with a cross-sectional area which is essentially equal to the cross-sectional area of the fuselage when said articulated intake structure is positioned for supersonic flight.

* * * * *